United States Patent
Campagna et al.

(10) Patent No.: US 10,169,591 B2
(45) Date of Patent: Jan. 1, 2019

(54) CHAINED SECURITY SYSTEMS

(71) Applicant: Amazon Technologies, Inc., Reno, NV (US)

(72) Inventors: Matthew John Campagna, Bainbridge Island, WA (US); Gregory Alan Rubin, Seattle, WA (US); Eric Jason Brandwine, Haymarket, VA (US); Matthew Shawn Wilson, Bainbridge Island, WA (US); Cristian M. Ilac, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 343 days.

(21) Appl. No.: 14/960,553

(22) Filed: Dec. 7, 2015

(65) Prior Publication Data

US 2017/0161505 A1     Jun. 8, 2017

(51) Int. Cl.
*G06F 21/00* (2013.01)
*G06F 21/60* (2013.01)
*G06F 9/455* (2018.01)
*G06F 21/57* (2013.01)

(52) U.S. Cl.
CPC ........ *G06F 21/602* (2013.01); *G06F 9/45558* (2013.01); *G06F 21/57* (2013.01); *G06F 2009/4557* (2013.01); *G06F 2009/45587* (2013.01); *G06F 2221/2153* (2013.01)

(58) Field of Classification Search
CPC .... G06F 21/602; G06F 21/57; G06F 9/45558; G06F 2221/2153; G06F 2009/4557; G06F 2009/45587

USPC ......................................................... 713/189
See application file for complete search history.

(56) References Cited

U.S. PATENT DOCUMENTS

| 8,176,336 | B1  | 5/2012  | Mao |
|-----------|-----|---------|-----|
| 8,627,414 | B1  | 1/2014  | McCune |
| 2006/0256108 | A1* | 11/2006 | Scaralata ............... G06F 21/57 345/418 |
| 2014/0006776 | A1* | 1/2014 | Scott-Nash ............ G06F 21/57 713/156 |

(Continued)

OTHER PUBLICATIONS

International Search Report and Written Opinion issued in Application No. PCT/US16/065351, dated Feb. 24, 2017, 11 pages.

*Primary Examiner* — Mohammad W Reza
(74) *Attorney, Agent, or Firm* — Hogan Lovells US LLP

(57) ABSTRACT

A tiered credentialing approach provides assurance to customers having virtual machines running in a remote environment that the virtual images for these machines are in a pristine state and running in a trusted execution environment. The environment can be divided into multiple subsystems, each having its own cryptographic boundary, secure storage, and trusted computing capabilities. A trusted, limited subsystem can handle the administrative tasks for virtual machines running on the main system of a host computing device. The limited system can receive a certificate from a certificate authority, and can act as a certificate authority to provide credentials to the main system. Upon an attestation request, the subsystems can provide attestation information using the respective credentials as well as the certificate chain. An entity having the appropriate credentials can determine the state of the system from the response and verify the state is as expected.

16 Claims, 9 Drawing Sheets

(56) References Cited

U.S. PATENT DOCUMENTS

2014/0108784 A1* 4/2014 Pendarakis .......... H04L 63/062
                                                                         713/156

* cited by examiner

CHAINED SECURITY SYSTEMS

BACKGROUND

As an increasing number of applications and services are being made available over networks such as the Internet, an increasing number of content, application, and service providers are turning to technologies such as cloud computing. Cloud computing, in general, is an approach to providing access to electronic resources through services, such as Web services, where the hardware and/or software used to support those services is dynamically scalable to meet the needs of the services at any given time. A customer typically will rent, lease, or otherwise pay for access to resources through the cloud, such that the customer does not have to purchase and maintain the hardware and software to provide access to these resources. A potential disadvantage to such an approach, at least from a customer point of view, is that the resources typically are at a location under control of the provider of those resources, and thus are out of the direct control of the customer. Further, the resources are often shared with other customers such that data, software, and resource security and integrity may be compromised.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing security in a shared computing environment. In particular, various embodiments provide assurance to customers having virtual machines running in a remote environment that the virtual image(s) for these machines is in a pristine state and running in a trusted execution environment. In particular, various embodiments utilize a tiered credentialing approach wherein the environment is logically divided into sub-systems such as a limited subsystem (l-sys) and a main subsystem (m-sys), wherein the l-sys can host the administrative processes for virtual machines running on the m-sys. The l-sys can be provided using a peripheral device with a trusted co-processor, for example, while the m-sys can be provided by the raw host computing device. Since the l-sys has a higher level of trust than the m-sys, and is physically connected to the m-sys, the l-sys can receive a certificate from a certificate authority, and can provide credentials to the m-sys whereby the l-sys acts as a certificate authority for the m-sys. During an attestation phase, the relevant information for each subsystem can be hashed, for example, and combined with the chain of certification in order to provide the desired attestation. The relevant information can include the appropriate identifiers, as well as the credentials for each subsystem. An entity receiving the information can use the appropriate credentials to extract the state information for the system and verify that the information is as expected, in order to provide assurance that the virtual image for the respective customer machine is in a pristine state and running in a trusted execution environment.

Various other applications, processes, and uses are presented below with respect to the various embodiments.

Figure 1:
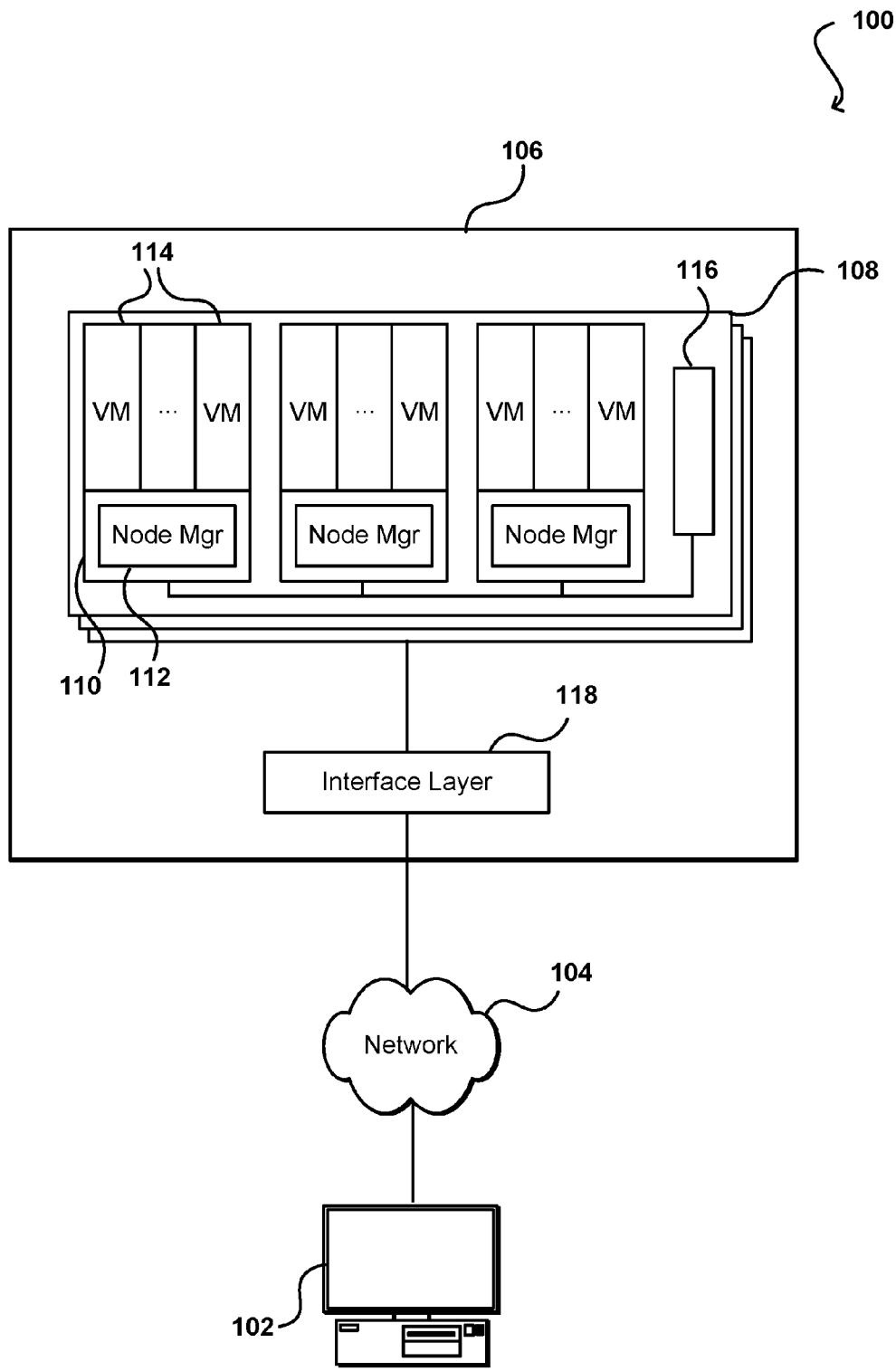
FIG. 1 illustrates an example environment in which various embodiments can be implemented.

FIG. 1 illustrates an example environment 100 in which aspects of the various embodiments can be implemented. In this example, a user is able to utilize a computing device 102 to submit a call or request across at least one network 104 to be received to a shared resource environment 106, such as a data center or "cloud" environment, among other such options. The computing device 102 can include any appropriate device, as may include client devices such as personal computers, cell phones, handheld messaging devices, laptop computers, set-top boxes, personal data assistants, electronic book readers, and the like. The at least one network 104 can include any appropriate wired and/or wireless network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail.

The resource environment 106 in this example includes an interface layer 118, as may include components such as application programming interfaces (APIs), routers, switches, Web servers, and other such components known or used for routing communications from a user computing device 102 to an appropriate resource in the environment. In this example, the resource environment 106 includes a number of racks 108, each rack including a number of host computing devices 110, as well as an optional rack support computing system 116 in this example embodiment. The host computing systems 110 on one of the illustrated racks 108 each host one or more virtual machines 114 in this example, as well as a distinct virtual machine manager 112 associated with the virtual machines on that host computing system. The virtual machine manager (VMM) is tasked with managing the virtual machines (VMs) on the respective host device, and handling various aspects of virtualization. Each virtual machine 114 can act as an independent computing resource for executing one or more tasks on behalf of a user, where the virtual machine functions as a dedicated resource for the user. The environment can also include additional host computing systems that do not include distinct virtual machines, but may nonetheless each act as a computing resource for one or more users. The rack support computing system 116 may provide various utility services for other computing systems local to its rack (e.g., long-term program storage, metering, and other monitoring of program execution and/or of non-local block data storage access performed by other computing systems local to the rack, etc.), as well as possibly to other computing systems located in the environment 106. Each computing system may also have one or more local attached storage devices (not shown), such as to store local copies of programs and/or data created by or otherwise used by the executing programs, as well as various other components.

It will be appreciated that the example of FIG. 1 has been simplified for the purposes of explanation, and that the number and organization of host computing systems and other devices may be much larger than what is depicted in FIG. 1. For example, as one illustrative embodiment, there may be approximately tens of thousands of computing systems in a cloud environment, with at least some of those computing systems being host computing systems that may each host multiple virtual machines.

Figure 2:
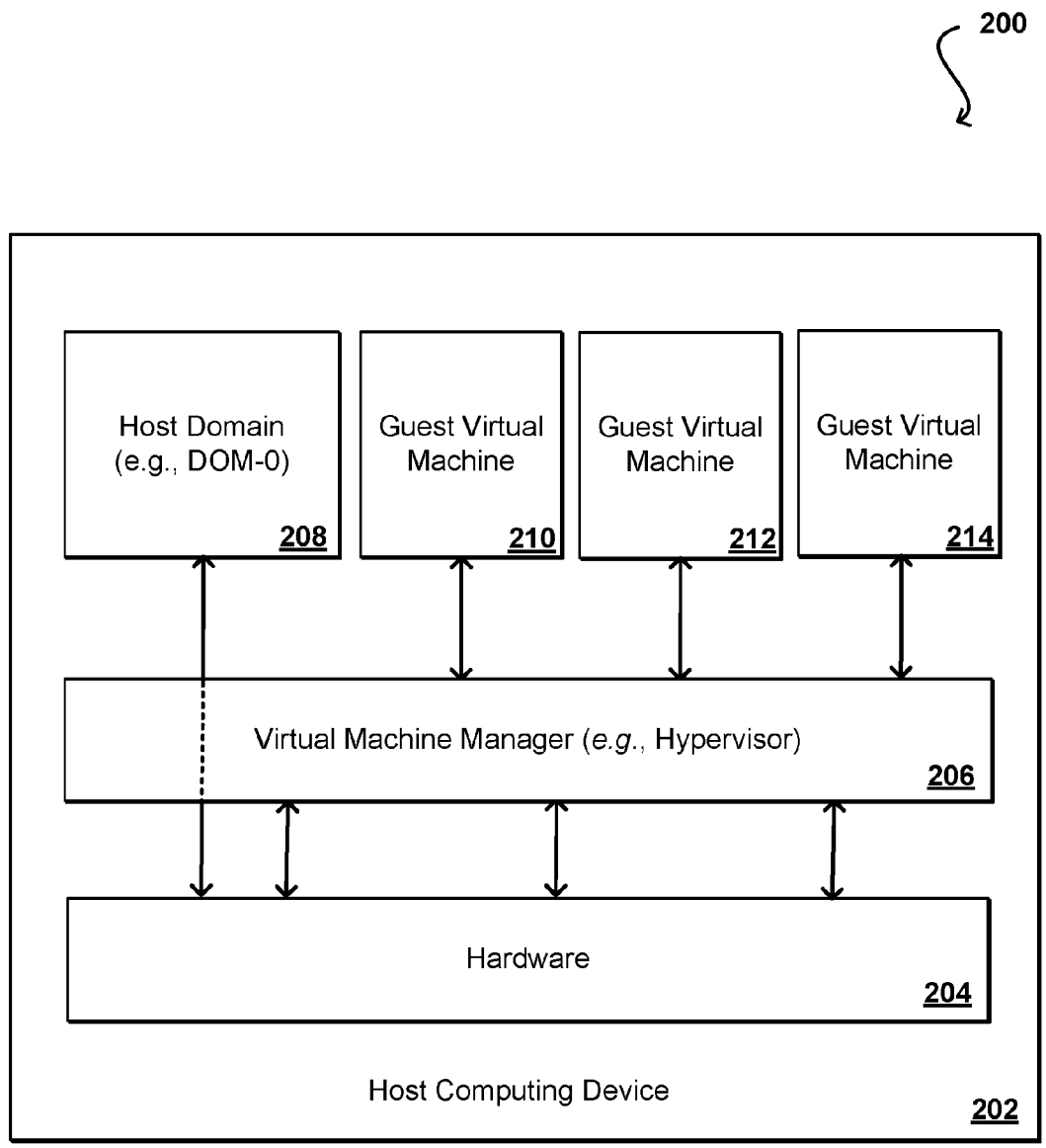
FIG. 2 illustrates an example configuration for a virtual machine manager running multiple guest virtual machines that can be used in accordance with various embodiments.

A number of virtualization techniques can be used to simultaneously operate a plurality of guest virtual machines (VMs) or guest operating systems (OSs) on a given host machine. FIG. 2 illustrates an example 200 of utilizing one virtualization technique using a virtual machine manager (VMM), such as a hypervisor, in accordance with various embodiments. The hardware 204 (e.g., the central processor and other such components) of the host computing device 202 is able to interface with the VMM 206 running directly on the hardware 204, such in the case of a "bare metal" or native hypervisor. Examples of hypervisors useful for such purposes include Xen, Hyper-V®, and the like. Hypervisors typically run at a higher, more privileged processor state than any other software on the machine, and provide services such as memory management and processor scheduling for dependent layers and/or domains. The most privileged of such layers and/or domains resides in the service domain layer, which may include a host domain 208 that may include an administrative operating system for configuring the operation and functionality of the hypervisor 206, as well as that of domains of lower privilege, such as the domains of the guest virtual machines 210, 212, 214 or other operating systems, which may be heterogeneous (i.e., running different operating systems than each other). The host domain 208 (e.g., the DOM-0) may have direct access to the hardware resources 204 of the host computing device 202 by way of the hypervisor 206, while the guest virtual machine domains 210, 212, 214 may not.

In certain embodiments, there can be various modes of operations. For example, to update the microcode on a host computing device, the host computing device can receive an update from a trusted source and enter a system management mode (SMM), such as by receiving a system management interrupt (SMI) to interrupt normal hypervisor execution. Entering SMM causes the execution of all the physical processor cores except for a single physical core (e.g., the bootstrapping core) in the processor to be suspended in at least some conventional designs. The single physical core that remains executing will be responsible for applying the update. In some embodiments, it may be ensured that the processor finishes executing all of the update for the particular instruction that it was executing at the time of detecting the SMI or other interrupt signal before suspending the execution of the physical cores. The received update (e.g., for firmware, software, or microcode) can be signed and/or encrypted by a trusted source, such as the service provider or processor manufacturer. In one example, the update can be signed using a private key or other such credential of a trusted source in order to ensure authenticity of the update. If the update is signed using a private key, the host computing device may need to validate the signature of the update before applying the patch. In some embodiments, the public key used to verify the signature can be stored in a trusted platform module (TPM) (not shown) on the host computing device. In some embodiments, the update can be encrypted using asymmetric or symmetric cryptography. For example, the update may be encrypted using a public key in order to ensure privacy of the update. If the update is encrypted, then any intermediate parties that handle the update cannot read the update or ascertain its contents unless they have access to the private key used to the decrypt the update. If the update is encrypted, then the private key to decrypt the update can be stored to the TPM, similarly to the public key for verifying the update, as previously described. Once the update is authenticated and/or decrypted, the update can be applied to the host computing device 202. If SMM is used to apply the update, then the instructions to apply the update can be implemented in an SMI handler, or SMI handler can cryptographically verify and call a patch function pre-configured in a hypervisor. A potential downside to such an approach, however, is that the virtual machine manager (VMM) on a host machine that is exposed to one or more outside users can become compromised. As a result, one of the guest virtual machines (VMs) 210, 212, 214 on the host computing device 202 can potentially access the TPM in the host hardware 204 through the hypervisor 206.

Figure 3:
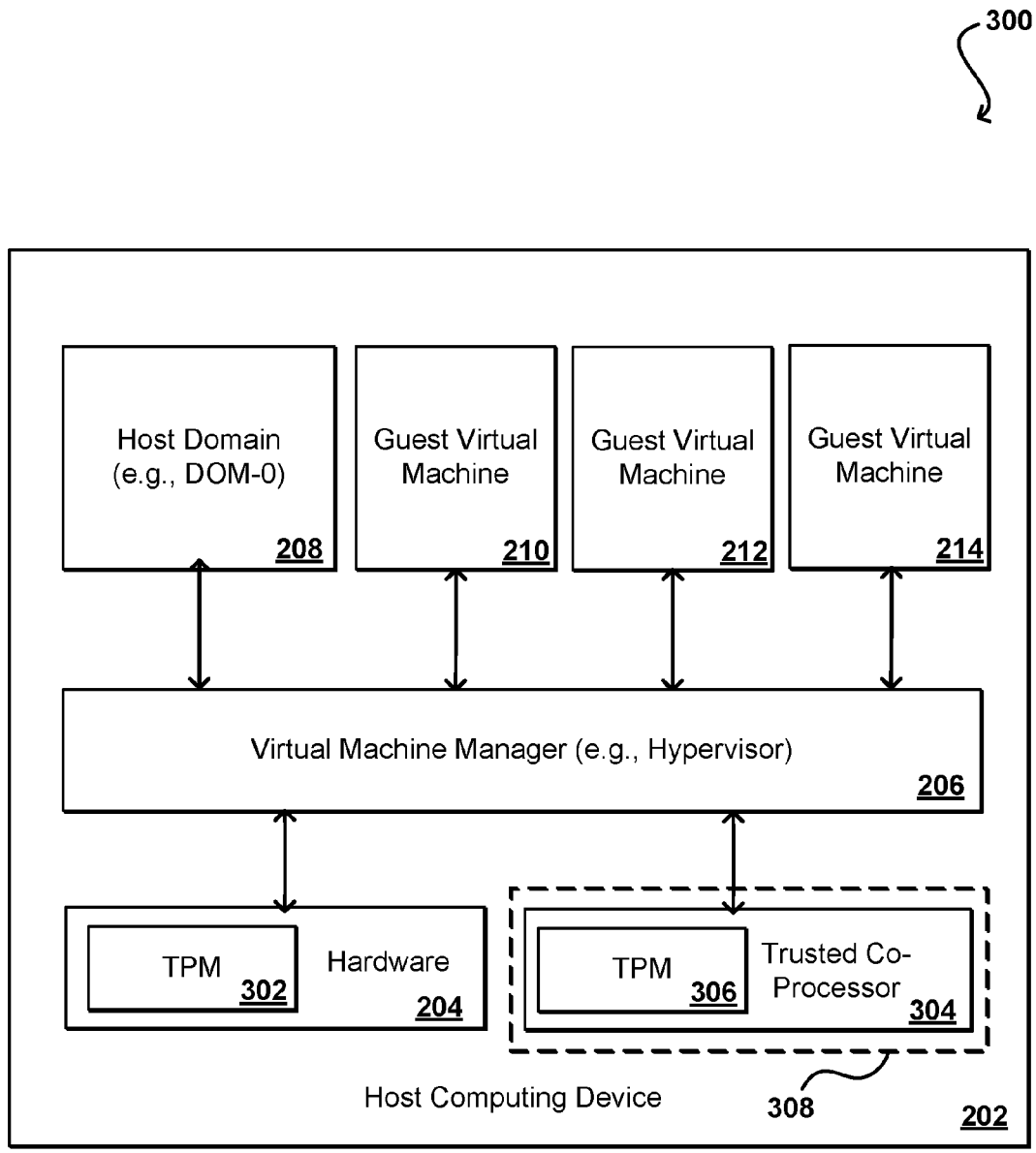
FIG. 3 illustrates an example environment including a trusted co-processor that can be utilized in accordance with various embodiments.

Approaches in accordance with various embodiments can attempt to improve security in such an environment while ensuring that customer secrets, keys, secure data, and other such objects are well secured within that environment, and that no unintended or unexpected modification of the environment has occurred. FIG. 3 illustrates an example environment 300 that can be used to provide such security. It should be noted that reference numbers for similar components can be carried over between figures for purposes of simplicity of explanation, but such usage should not be interpreted as a limitation of the scope of the various embodiments unless otherwise specifically stated. In this example, the host computing device 202 includes (or is capable of receiving) a trusted co-processor 304, or secure co-processor, that can communicate with the VMM 206 and other components of the host machine. The trusted co-processor 304 can be provided via a peripheral device, for example, such as a PCI device that is removable from the host computing device 202. The trusted co-processor can include one or more processors, memory, one or more interfaces, and any other components or connections known for providing a peripheral device or additional processor to such a system. In one embodiment, the trusted co-processor is an independent hardware component that takes the form of a separate PCIE card that includes specific firmware. The configuration of the trusted co-processor enables it to be logically considered to be within a trust boundary, cryptographic boundary, trust region, or trusted enclave, associated with the customer VM. In at least some embodiments, the peripheral card can be manufactured, configured, or otherwise provided by a provider of the resource environment, or an entity trusted by the provider, such that the provider can have a higher level of trust in the security of the peripheral card, or other such additional or removable hardware, than in the security of the raw host computing device 202.

A trusted co-processor 304, or other such hardware device, can provide the advantage of being able to offload many of the administrative tasks from the host computing device 202 such that the host computing device can be substantially dedicated to hosting customer virtual machines, processing customer data, or performing other such tasks. The computational resources dedicated to the customer can thus be provided by the host computing device, enabling the host hardware usage for customer tasks to be maximized, while the administration of those resources is managed by the trusted co-processor. This has the further advantage that all administrative processes will be run in a trusted computing environment 308, or within a trust boundary corresponding to the hardware with the higher level of provider trust. A further advantage is that the provider can provide security assurances that provider access is limited to only the necessary resources, and the system is running trusted software.

The components such as the trusted co-processor 304 within the trusted computing environment 308 thus can be logically considered a sub-system on the host device, where that subsystem has relatively limited functionality. This separate, "limited" subsystem is contained within the associated cryptographic boundary, and is referred to herein as "l-sys." At least a portion of the hardware of the host can then be dedicated to providing and maintaining the virtual machines, or virtual hosts, running on the host machine. This "main" subsystem, contained within a separate cryptographic boundary, is referred to herein as "m-sys." The provider access thus can be at least somewhat limited to the l-sys for purposes of provider administrative functions for the guest machines hosted in the m-sys.

Even with such separation and limiting of provider access, however, the provider will still need to be able to provide assurances to customers (with virtual instances running in the virtual environment) that the virtual image for each customer instance is in a "pristine" or expected state, without unexpected modification, and that the instance is running in a trusted execution environment. Approaches in accordance with various embodiments can provide such assurances using a tiered or chained credentialing mechanism, whereby subsystems can have their own credentialing mechanisms enabling the subsystems to be identified and the software and virtual systems running on top of subsystems to be verified as authentic. Each subsystem in at least some embodiments can have its own cryptographic boundary, secure storage, and trusted computing capabilities, as well as an ability to run additional firmware and software.

Further, at least some subsystems can utilize separate memory and processor space as part of a trusted computing environment, such as may be modeled as a trusted platform module (TPM) or other such component. A TPM can be used to perform remote attestation, such as to remotely verify the authenticity of a system running on a host. By providing a series, chain, or hierarchy of TPMs, for example, the subsystems can be identified and the software and virtual systems running a top those sub-systems can be verified as authentic. Although examples discussed herein relate to a two-system host, including the l-sys and m-sys, it should be understood that various other numbers and/or configuration of subsystems can be used as appropriate within the scope of the various embodiments.

As mentioned, customers performing sensitive or confidential tasks using embedded systems in the resource provider environment will often want to be able to ensure that the remote embedded systems were not unexpectedly modified or tampered with, and that the embedded systems and virtual machines will function as expected. One approach for verifying such operation involves remote attestation. Remote attestation provides for the detection of unauthorized or unexpected changes to a computing environment, such as various subsystems described herein. These changes can include modifications to attempt to circumvent security measures. During a conventional remote attestation process, a host machine can generate a certificate indicating the software currently running on the host. The certificate can then be provided to the customer, or another appropriate party, in order to prove that the software currently executing in the environment is unmodified or as expected. Remote attestation can take advantage of public key encryption, for example, to ensure that the information regarding the software is only exposed to the party requesting the attestation, or other party having obtained the appropriate key. A TPM in general is a dedicated microprocessor that can secure hardware by installing cryptographic keys into the hardware. A TPM can utilize a unique encryption key that is inaccessible outside the TPM in order to enforce expected behaviors on the hardware and software of the host. In some embodiments the unique key is an endorsement key, such as a 2048-bit RSA public and private key pair, that is immutable and unexportable from the TPM. The public key for the endorsement key can be contained within a certificate for the TPM. A TPM can perform remote attestation in some embodiments by generating a hash summary of the hardware and software configuration of the corresponding environment or subsystem. The hash value can be generated using any appropriate cryptographic hashing algorithm, such as may generate MD5, SHA-1, SHA-2, or SHA-3 hashes.

Approaches in accordance with various embodiments can utilize a first TPM 306 in the l-sys, or peripheral with trusted co-processor 304 in this example, and a second TPM 302 in the m-sys, or remainder of the host computing device 202 in this example, to perform remote attestation. The trusted l-sys environment 308 can function as a root of trust for the attestation of one or more other subsystems, such as the m-sys, on the device, capable of performing an attestation of the m-sys. The l-sys can generate an attestation integrity key pair and a host identity key pair, with the public key bound to a certificate from a certificate authority as discussed previously. That information can be used to uniquely identify the device within the infrastructure, as well as to generate a hash for attestation. In some embodiments, an attestation request will include some type of question, task, or challenge, and the device receiving the request can gather the information with the question, task, or challenge and generate a hash to be returned to the source of the request (or another appropriate party or destination). The attestation request can be received through an API and triggered through a console or other such interface. In some embodiments the attestation request can come from within the customer virtual machine, such as from a virtual TPM or other such attestation device. The requesting party can then use its copy of the appropriate key to ensure that the correct challenge was included, as well as the expected values for all information for the challenge. This can help to ensure that the software, hardware, configuration, and/or other aspects of the l-sys are as expected and no unexpected modification has occurred. Once the l-sys is verified to be operating as expected, the l-sys (which can include firmware under control of the provider) can boot or otherwise initialize the m-sys, or upper level system. The m-sys can also have a TPM that can generate an attestation integrity key pair and a host identity key pair, with the public key bound to an appropriate certificate. That information can be used to uniquely identify the device within the infrastructure, as well as to generate a hash for attestation. In this example, the l-sys can be the certificate issuing authority for the m-sys. The l-sys, or trusted co-processor, can thus issue the certificate, act as a certificate sub-authority, and certify that it is physically attached to the m-sys TPM, since the trusted co-processor has a physical connection to the host. Such an approach can provide a full attestation chain. A customer or other entity wanting to attest a host can obtain an attestation through the certificate of the m-sys, corresponding to the host of the designated virtual machine, that is chained to the l-sys, and the peripheral card or trusted co-processor, which is chained to the original certificate authority.

In one example, a customer system is communicating with a customer virtual machine running on a virtual host in the resource provider environment. The customer system can be aware of information such as an instance identifier (ID) bound to the virtual machine, as well as a host ID for the host computing device running the virtual machine. The customer system can then send an attest command, or attestation request, to the customer virtual machine. The virtual machine can receive the request, which may arrive through the peripheral device or l-sys in some embodiments. The virtual machine can receive the instance ID and the host ID and determine that the virtual machine has correctly received the request, and that an attestation should be provided. In order to provide the attestation, information needs to be returned for both the trusted root system, or l-sys, and the main system, or m-sys. In this example, the virtual machine can send an attest command to the l-sys, which can generate the appropriate hash using the expected information and the challenge of the attest command. The l-sys can also send an attest command to the m-sys, which can generate a similar hash for the m-sys information. The hash of the m-sys can contain information for the expected boot image of the customer for the virtual machine. The virtual machine can obtain both hash values, for example, and can send back the appropriate information for the attestation. This can include, for example, the hash values for l-sys and m-sys, as well as the certificate chain for the l-sys and m-sys. The customer system receiving the information can verify that the image is as expected and can trust the attestation chain. A customer system getting quotes (or other measurements, which may be signed) for each subsystem can also verify the signature on each quote, as well as the values within those signatures. The customer system can also verify that the m-sys certificate was issued by the l-sys, and the l-sys certificate was issued by a trusted certificate authority. As long as the customer trusts the certificate authority, the customer should be able to verify the information indicating that the customer virtual machine is operating as expected.

The information provided as part of the hash for verification purposes can include any appropriate information for the relevant subsystem. For the l-sys where the trusted co-processor is on a peripheral card, for example, the hash can include values for the PCR registers, or information for the firmware for the trusted co-processor. Various other types of information can be utilized as well. A determination of which information to include can balance the usefulness of including a lot of information, which provides increased security that the system or environment is operating as expected, with the need to maintain knowledge of the current state of the system or environment such that the customer system can know or determine the appropriate hash to expect for the current state. An advantage to using a chain of attestation is that the l-sys, in addition to being a more trusted environment due to the nature of the subsystem, is a more controlled and simple environment, such that the likelihood of a hashing or matching error is significantly reduced, and the likelihood of compromise is significantly reduced as well. Since both the hardware and software of the m-sys will be sourced from outside the resource provider environment, in many cases, there can be fewer or weaker assurances that the environment is secure. The nature of the subsystems makes it beneficial for the trusted subsystem to be able to certify the other due to the level of trust in the l-sys and the physical connection of the l-sys to the m-sys, among other such advantages.

Figure 4:
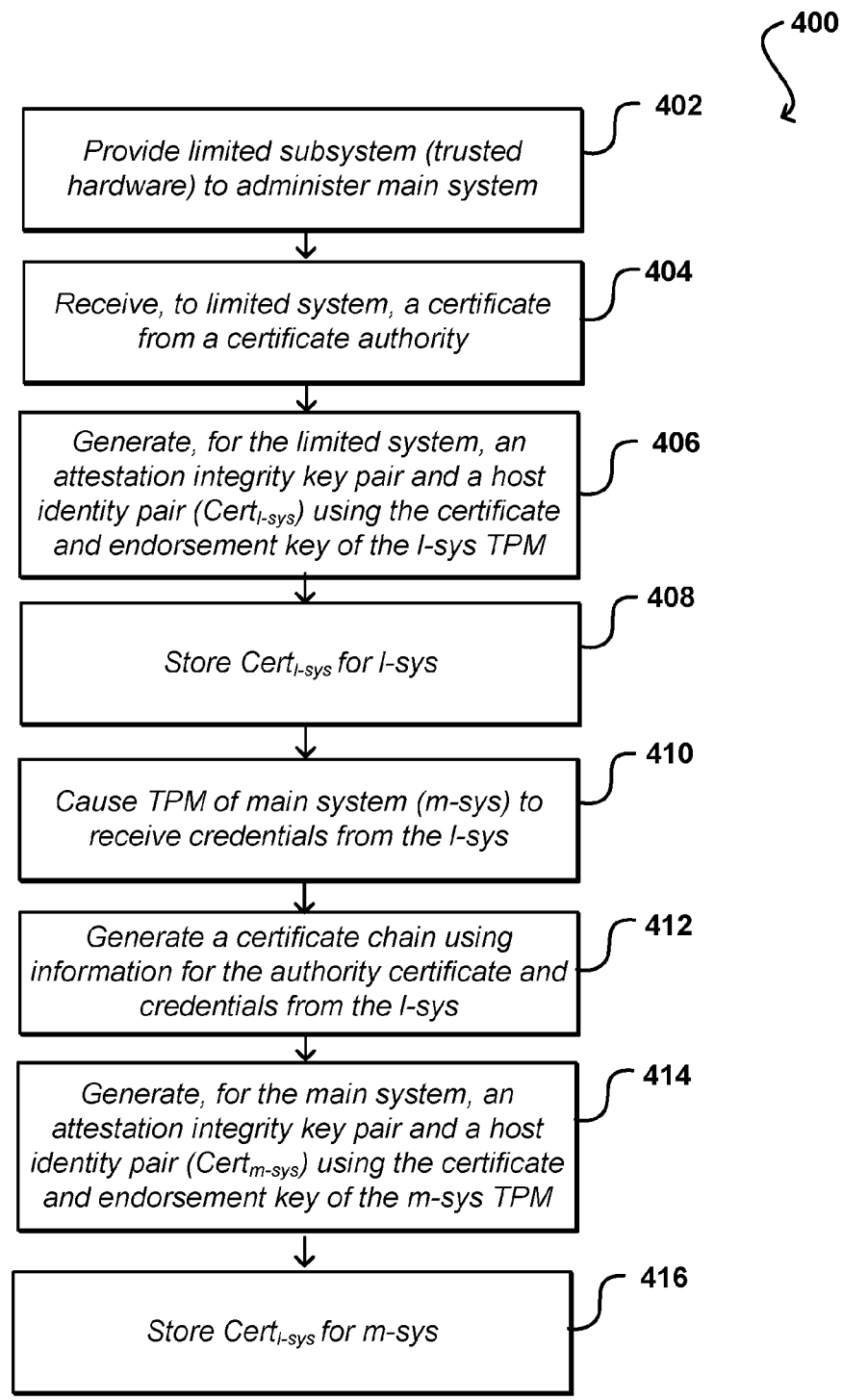
FIG. 4 illustrates an example credentialing process that can be utilized in accordance with various embodiments.

In order to enable the remote attestation using a tiered subsystem approach, a credentialing process is first used in at least some embodiments in order to ensure that the subsystems have the appropriate credentials for the attestation. FIG. 4 illustrates an example process 400 for providing credentials to tiered subsystems that can be utilized in accordance with various embodiments. It should be understood that, for any process discussed herein, there can be additional, fewer, or alternative steps, performed in similar or different orders, or in parallel, within the scope of the various embodiments unless otherwise stated. In this example, a limited system can be provided 402 for purposes of administering the main system on a host computing device, where the limited system can have trusted hardware and software as discussed herein, and can be contained within an associated cryptographic and/or trust boundary. The l-sys can receive 404 a certificate from a certificate authority using any of various processes discussed or suggested herein, or known in the art for obtaining digital certificates. The l-sys can generate 406 an attestation integrity key pair and a host identity key pair, where the public keys are bound to the certificate issued by the respective certificate authority and are generated using a certified endorsement key from the TPM of the l-sys. Any of various techniques can be used to bootstrap from a known or certified endorsement key to a certified host attestation or identity key via a certificate authority. Upon conclusion the l-sys TPM can have a certificate authority-certified attestation integrity key and host identity key. These certified keys can be stored 408 and represented anonymously by $Cert_{l-sys}$.

Further in the credentialing stage, the m-sys TPM can be accessible from m-sys. The l-sys can communicate with the m-sys without requiring off-box network traffic. The m-sys TPM can be caused to acquire 410 credentials from the l-sys, which can be used to generate 412 a certificate chain. The certificate authority thus certifies the l-sys, and the l-sys certifies the m-sys keys. The m-sys credentialing can utilize a method whereby the certificate authority is replaced by l-sys's authority-certified host identity key. The m-sys can generate 414 an attestation integrity key pair and a host identity key pair, where the public keys are bound to the credentials issued by the l-sys and are generated using a certified endorsement key from the TPM of the m-sys. Upon conclusion the m-sys TPM can have an l-sys-certified attestation integrity key and an l-sys certified host identity key. These certified keys can be stored 416 and be represented anonymously by $Cert_{m-sys}$.

Figure 5:
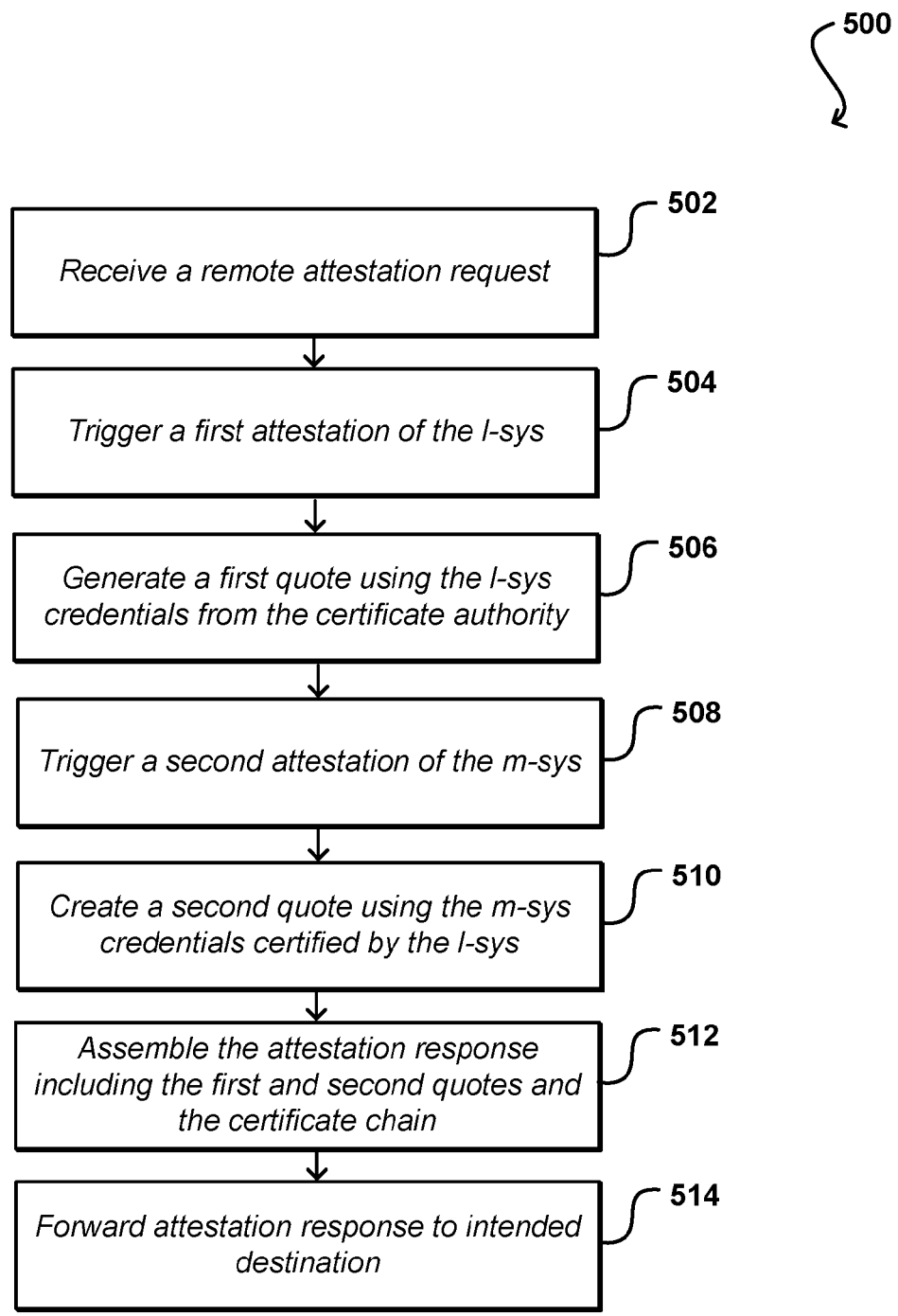
FIG. 5 illustrates an example attestation process that can be utilized in accordance with various embodiments.

Once both subsystems (or all subsystems in the case of more than two subsystems) are credentialed, a customer deployment running on the system can be attested. FIG. 5 illustrates an example process 500 for attesting a customer deployment that can be utilized in accordance with various embodiments. Such a process can be broken down into various portions in at least some embodiments, including an attestation request portion and an attestation response portion. In at least some embodiments there can also be an attestation response validation process or portion. A first portion, relating to the attestation request, involves an entity requiring attestation of a customer deployment. In this example, an attestation request is received 502, where the attestation request includes information such as the host identity (h-id) for the host computing device of the customer deployment. The attestation request can initially be received to a control plane component, as discussed elsewhere herein, then forwarded to a limited system component or interface, among other such options. As part of the process, a random cryptographic nonce N, or other arbitrary single-use number, can be generated with the attestation request then consisting of at least the values h-id and N. The output attestation request can be received to the host h-id in at least some embodiments.

The credentialed host with the host identity h-id can receive the request, which may have come through the l-sys. The credentialed host, as discussed, will have an identity h-id, consisting of values for m-sys and l-sys, where l-sys has been certified by the certificate authority. The m-sys, or other component receiving or being notified of the request, for example, can trigger 504 an attestation of the l-sys. In response to the attestation request, the h-id for the intended attestation target can be verified. A first attestation quote, Quote1, (or other signed measurement) can be created 506 using the nonce N and the l-sys credentials certified by the certificate authority. The l-sys can, in turn, send 508 an attestation request on to the m-sys. The m-sys can create 510 a second attestation quote, Quote2, using the nonce N, and the m-sys credentials certified by the l-sys. As mentioned elsewhere herein, each quote can include a hash of the respective information in at least some embodiments. The l-sys can then receive Quote2 and credential $Cert_{m\text{-}sys}$ from the m-sys and assemble 512 the attestation response including Quote1, Quote2, and the certificates $Cert_{m\text{-}sys}$ and $Cert_{l\text{-}sys}$, or certificate chain in some embodiments, which can form the output to be returned as the attestation response. The l-sys can then forward 514 the request to the appropriate destination or address.

Figure 6:
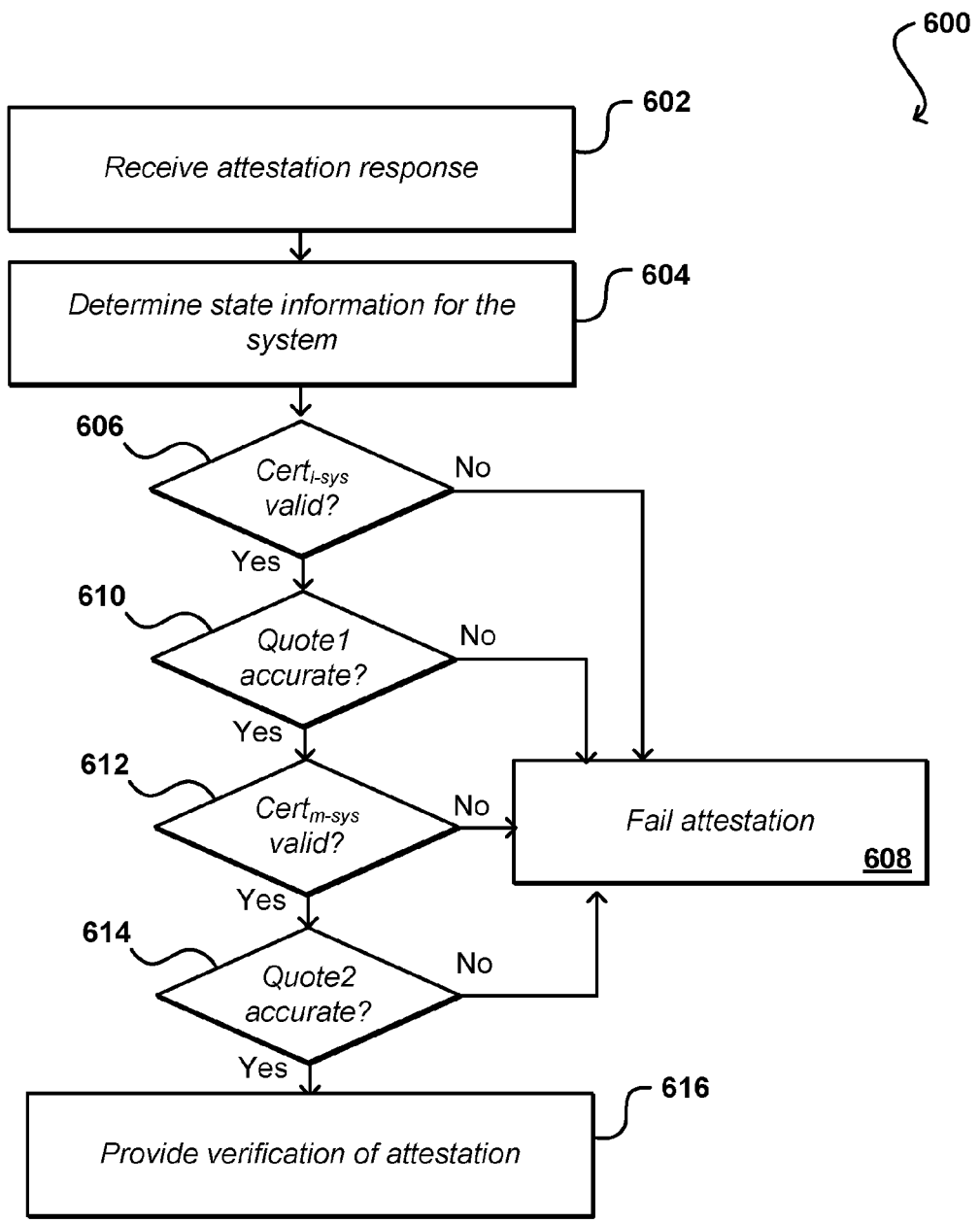
FIG. 6 illustrates an example attestation verification process that can be utilized in accordance with various embodiments.

In at least some embodiments, an entity receiving the attestation response (or another interested and authorized entity) and having authenticity guarantees of the state may want to verify the attestation. FIG. 6 illustrates an example process 600 for verifying an attestation response that can be utilized in accordance with various embodiments. In this example, an attestation response is received 602 by an entity that has an interest in verifying the attestation, such as a customer associated with a deployment running in the resource provider environment, such as in the m-sys subsystem. As part of the verification process, the reported state for the system can be determined 604. The state information can include, for example, an authentic copy of the public key from the certificate authority, as well as a nonce N used to generate the attestation request for the host identity h-id. The state can also include a first set of acceptable attestation response values (PCR values) for the m-sys, a second set of acceptable attestation response values (PCR values) for the l-sys. The input can include the attestation quotes and credentials, including Quote1, Quote2, and the certificates $Cert_{m\text{-}sys}$ and $Cert_{l\text{-}sys}$. As part of the verification process, a first verification can be performed 606 that the $Cert_{l\text{-}sys}$ is a valid certificate from the certificate authority for the h-id. If not, an attestation fail response can be returned 608, or other remedial action taken. As mentioned, although these verifications are listed in a particular order for convenience, it should be understood that these determinations can be performed in different orders, or concurrently or otherwise, within the scope of various embodiments. A second verification can be performed 610 that the first quote Quote1 is signed using the appropriate h-id credentials in the $Cert_{l\text{-}sys}$, contains nonce N, and has the correct PCR value. If not, an attestation fail response can be returned 608, or other remedial action taken. A third verification can be performed 612 that $Cert_{m\text{-}sys}$ is a valid certificate from l-sys for the h-id. If not, an attestation fail response can be returned 608, or other remedial action taken. A fourth validation can be performed 614 that the second quote Quote2 is signed using the appropriate h-id credentials in the $Cert_{m\text{-}sys}$, contains the nonce N, and has the correct PCR values. If not, an attestation fail response can be returned 608, or other remedial action taken. If all verifications pass successfully, a pass or success message can be returned 616, or other similar action taken in response to the verification of the attestation.

Figure 7:
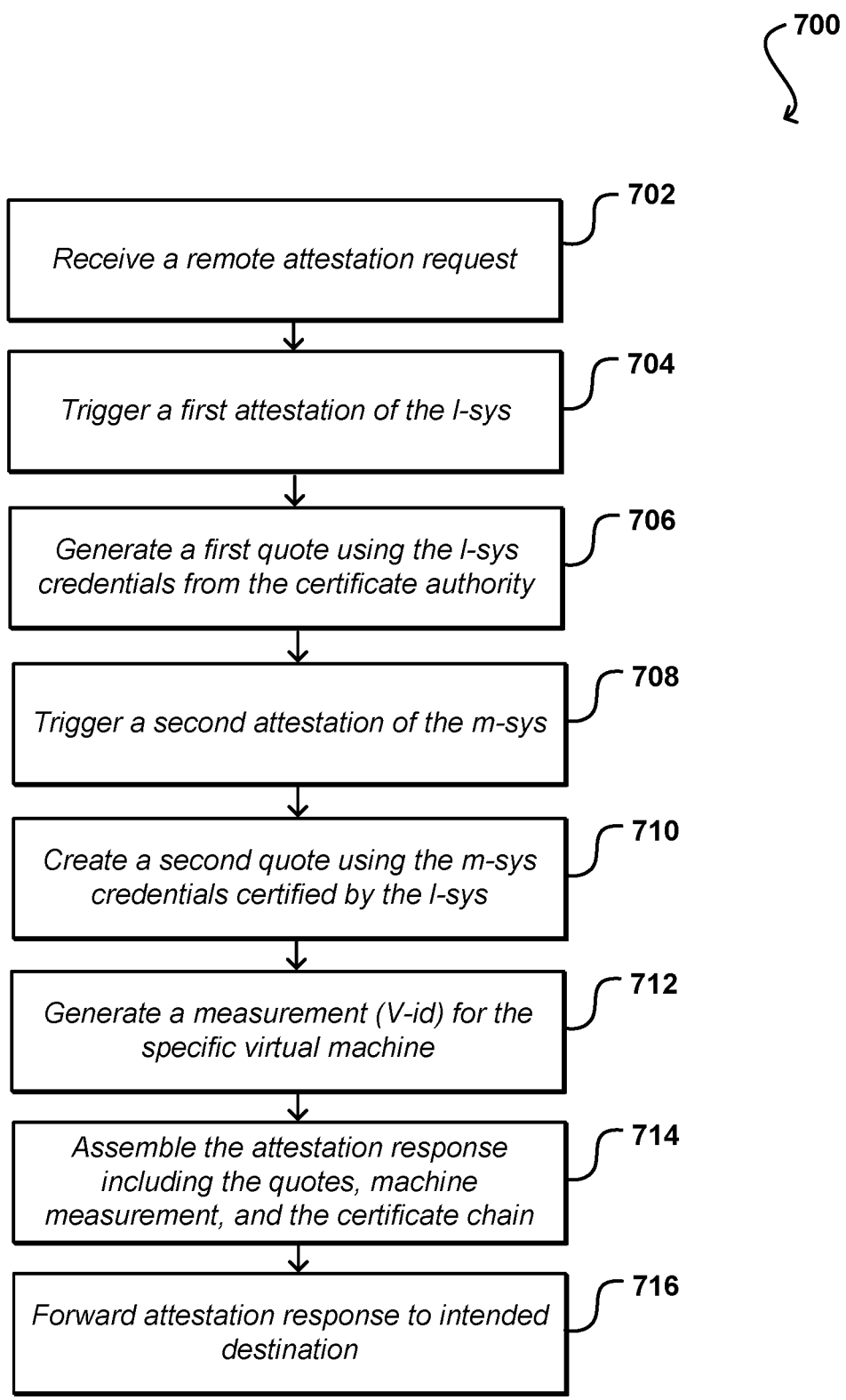
FIG. 7 illustrates another example attestation process that can be utilized in accordance with various embodiments.

FIG. 7 illustrates a similar process 700 for attestation, but in this case an attestation that is specific to a particular a virtual machine or customer instance running on the system. In this example, an attestation request for a remote virtual machine is received 702, where the attestation request includes information such as the identity of the virtual image (v-id) for the virtual machine and the host identity (h-id) for the host computing device on which the virtual image is loaded. As part of the process, a random cryptographic nonce N, or other arbitrary single-use number, can be generated with the attestation request then consisting of at least the values v-id, h-id and N. The output attestation request can be received to the host h-id in at least some embodiments.

The credentialed host with the host identity h-id can receive the request, which may have come through the l-sys. The credentialed host, as discussed, will have an identity h-id, consisting of values for m-sys and l-sys, where l-sys has been certified by the certificate authority. The m-sys, or other component receiving or being notified of the request, for example, can trigger 704 an attestation of the l-sys. In response to the attestation request, the h-id for the intended attestation target can be verified. A first attestation quote, Quote1, can be created 706 using the nonce N and the l-sys credentials certified by the certificate authority. The l-sys can, in turn, send 708 an attestation request on to the m-sys. The m-sys can create 710 a second attestation quote, Quote2, using the nonce N, and the m-sys credentials certified by the l-sys. The second attestation quote in some embodiments will cover the virtual image v-id represented in one or more of the PCR registers. A measurement, such as a signed measurement or quote, can also be determined or generated 712 for the specific virtual machine or customer instance, where in this example the measurement takes the form of v-id. The l-sys can then receive Quote2 and credential $Cert_{m\text{-}sys}$ from the m-sys and assemble 714 the attestation response including Quote1, Quote2, and the certificates $Cert_{m\text{-}sys}$ and $Cert_{l\text{-}sys}$, or certificate chain, which can form the output to be returned as the attestation response. The l-sys can then forward 716 the request to the appropriate destination or address.

Figure 8:
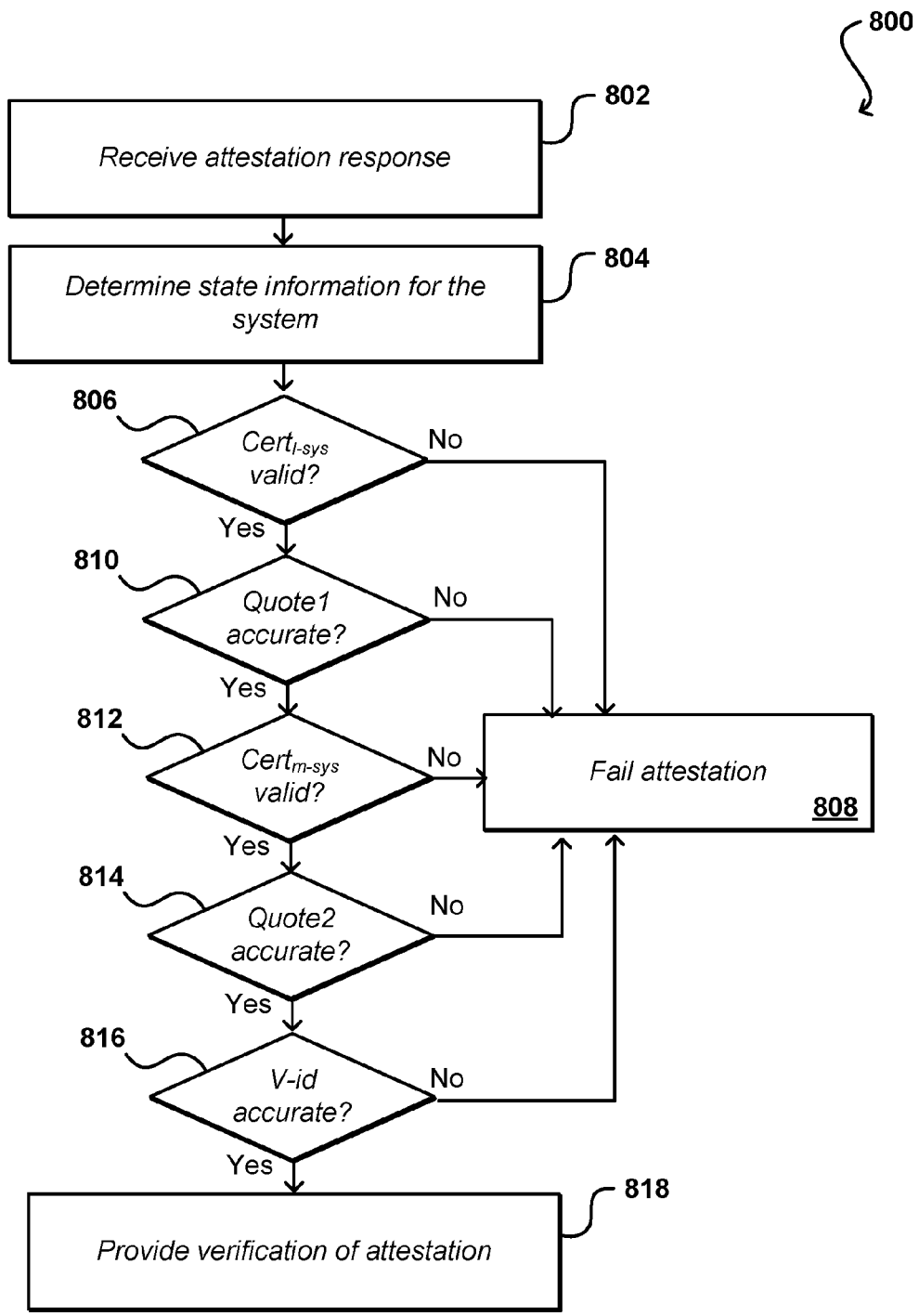
FIG. 8 illustrates another example attestation verification process that can be utilized in accordance with various embodiments.

In at least some embodiments, an entity receiving the attestation response (or another interested and authorized entity) and having authenticity guarantees of the state may want to verify the attestation. FIG. 8 illustrates an example process 800 for verifying an attestation response that can be utilized in accordance with various embodiments. In this example, an attestation response is received 802 by an entity that has an interest in verifying the attestation, such as a customer associated with a virtual machine running in the resource provider environment, such as in the m-sys subsystem. As part of the verification process, the reported state for the system can be determined 804. The state information can include, for example, an authentic copy of the public key from the certificate authority, as well as a nonce N used to generate the attestation request for the virtual image v-id and host identity h-id. The state can also include a first set of acceptable attestation response values (PCR values) for the m-sys, a second set of acceptable attestation response values (PCR values) for the l-sys, and an acceptable attestation response value for the virtual image v-id. The input can include the attestation quotes and credentials, including Quote1, Quote2, and the certificates $Cert_{m\text{-}sys}$ and $Cert_{l\text{-}sys}$. As part of the verification process, a first verification can be performed 806 that the $Cert_{l\text{-}sys}$ is a valid certificate from the certificate authority for the h-id. If not, an attestation fail response can be returned 808, or other remedial action taken. As mentioned, although these verifications are listed in a particular order for convenience, it should be understood that these determinations can be performed in different orders, or concurrently or otherwise, within the scope of various embodiments. A second verification can be performed 810 that the first quote Quote1 is signed using the appropriate h-id credentials in the $Cert_{l\text{-}sys}$, contains nonce N, and has the correct PCR value. If not, an attestation fail response can be returned 808, or other remedial action taken. A third verification can be performed 812 that $Cert_{m\text{-}sys}$ is a valid certificate from l-sys for the h-id. If not, an attestation fail response can be returned 808, or other remedial action taken. A fourth validation can be performed 814 that the second quote Quote2 is signed using the appropriate h-id credentials in the $Cert_{m\text{-}sys}$, contains the nonce N, and has the correct PCR values. If not, an attestation fail response can be returned 808, or other remedial action taken. A fifth verification can be performed 816 that the values in Quote2 contain an acceptable attestation response value for the virtual image for v-id, which is most likely a dedicated or additive PCR value in at least some embodiments. If not, an attestation fail response can be returned 808, or other remedial action taken. If all verifications pass successfully, a pass or success message can be returned 818, or other similar action taken in response to the verification of the attestation.

In some embodiments, the TPM or other trusted environment may not be provisioned with verifiable credentials such as a certificate. For these situations, a specific provisioning process can be utilized where physical access to the host can be used instead. In some embodiments the attesting of a remote system can require special privileges. Certified credentials for the requesting entity can be established, where possible, and used to validate the authenticity of the attestation request. Most notably, a certified asymmetric key pair can be used and the attestation request signed. In some embodiments, neither the host identity h-id nor the virtual image identifier v-id need to be known for attest creation. The host identity does not necessarily need to be known at the time of attestation request generation, and the virtual image identifier can be reported back as part of the attestation quote, whereby the acceptable values can be determined.

In at least some embodiments the quote does not need to be restricted to the TPM-defined quote mechanism and may include additionally signed information using the identity key of the system. The m-sys attestation response can include sufficient information to determine the authenticity of multiple virtual images. This can be performed in some embodiments by returning multiple quotes, or combining multiple results into a single quote. Further, while a two system hierarchy is presented for purposes of explanation, it should be stated that any appropriate tree or hierarchical structure with a parent node of the certificate authority can be used as well within the scope of the various embodiments, wherein each node in the tree is signed by the parent node. Similarly there can be any number of root certificate authorities in at least some embodiments. In one such system, the l-sys forms a root for a family of subsystems contained within the single host.

Figure 9:
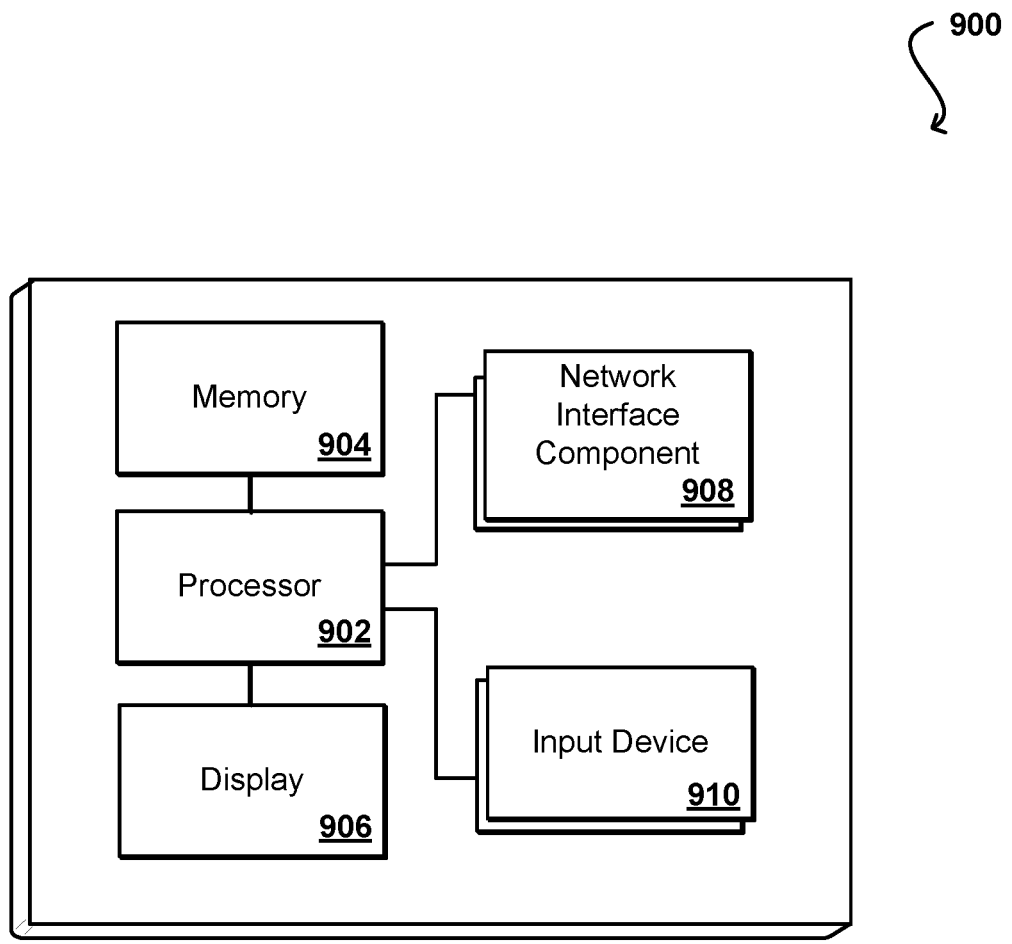
FIG. 9 illustrates example components of a computing device that can be utilized in accordance with various embodiments.

FIG. 9 illustrates a logical arrangement of a set of general components of an example computing device 900. In this example, the device includes a processor 902 for executing instructions that can be stored in a memory device or element 904. As would be apparent to one of ordinary skill in the art, the device can include many types of memory, data storage, or non-transitory computer-readable storage media, such as a first data storage for program instructions for execution by the processor 902, a separate storage for images or data, a removable memory for sharing information with other devices, etc. The device typically will include some type of display element 906, such as a touch screen or liquid crystal display (LCD), although devices such as portable media players might convey information via other means, such as through audio speakers. As discussed, the device in many embodiments will include at least one input element 908 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 900 of FIG. 9 can include one or more network interface elements 908 for communicating over various networks, such as a Wi-Fi, Bluetooth, RF, wired, or wireless communication systems. The device in many embodiments can communicate with a network, such as the Internet, and may be able to communicate with other such devices.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above.

For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    receiving an attestation request from a customer system to a main subsystem of a computing device, the computing device operating a customer virtual machine associated with the customer system;
    sending a request to a limited subsystem provided using trusted hardware physically connected to the computing device, the limited subsystem configured to perform administrative tasks for the customer virtual machine;
    receiving, at the limited subsystem, a first certificate from a certificate authority;
    generating, at the limited subsystem, first credentials using the first certificate, a first measurement, and a second certificate for authenticating the main subsystem;
    receiving, at the main subsystem, the second certificate from the limited subsystem;
    generating, at the main subsystem, second credentials using the second certificate, and a second measurement including state information for the customer virtual machine; and
    sending an attestation response to the customer system, the attestation response including the first measurement with the first credentials and the second measurement with the second credentials.

2. The computer-implemented method of claim 1, further comprising:
    receiving the first certificate to a first secure crypto-processor of the limited subsystem; and
    generating the first credentials using the first certificate and a first endorsement key of the first secure crypto-processor, the first endorsement key unexportable from the first secure crypto-processor.

3. The computer-implemented method of claim 2, wherein the first credentials include a first attestation integrity key pair and a first host identity key pair associated with the limited subsystem.

4. The computer-implemented method of claim 2, further comprising:
    receiving the second certificate to a second secure crypto-processor of the main subsystem; and
    generating the second credentials using the second certificate and a second endorsement key of the second secure crypto-processor, the second endorsement key unexportable from the second secure crypto-processor.

5. The computer-implemented method of claim 4, wherein the second credentials include a second attestation integrity key pair and a second host identity key pair associated with the main subsystem.

6. The computer-implemented method of claim 1, further comprising:
    verifying an identity of the host machine using a first identifier included in the attestation request, and an identity of a customer machine image using a second identifier included in the attestation request, before sending the request to the limited subsystem.

7. The computer-implemented method of claim 1, further comprising:
    generating at least one hash value using at least one of the first measurement and the second measurement and including the at least one hash value in the attestation response, the at least one hash value associated with the customer system.

8. The computer-implemented method of claim 1, wherein the attestation response further includes at least one of a measurement for virtual instance or a certificate chain for the first and second certificates.

9. The computer-implemented method of claim 1, wherein the measurement is one of a quote or a cryptographically verifiable measurement.

10. The computer-implemented method of claim 1, wherein the trusted hardware is a peripheral card including firmware and instructions configured by a provider of an environment in which the computing device operates, wherein the peripheral card has a higher level of trust than the computing device.

11. The computer-implemented method of claim 1, further comprising:
    determining challenge information included in the attestation request; and
    including the challenge information in the attestation response.

12. A limited subsystem operating on a host computing device, comprising:
    at least one processor; and
    memory storing instructions that, when executed by the at least one processor, cause the limited subsystem to:
        receive an attestation request for a virtual machine running in a main subsystem on the host computing device, the limited subsystem provided using trusted hardware physically connected to the host computing device and configured to perform administrative tasks for the virtual machine;
        receive a first certificate from a certificate authority;
        generate first credentials for the limited subsystem, using a first certificate, a first measurement, and a second certificate;
        transmit the second certificate to the main subsystem;
        cause the main subsystem of the host computing device to generate second credentials for the main subsystem using a second certificate, and a second measurement including state information for the customer virtual machine; and cause an attestation response to be sent, the attestation response including the first measurement with the first credentials and the second measurement with the second credentials.

13. The limited subsystem of claim 12, wherein the instructions when executed further cause the host computing device to:

cause the second certificate to be sent to a second secure crypto-processor of the main subsystem; and cause the second credentials to be generated using the second certificate and a second endorsement key of the second secure crypto-processor, the second endorsement key unexportable from the second secure crypto-processor.

14. The limited subsystem of claim 12, wherein the instructions when executed further cause the host computing device to:

determine a cryptographic nonce included in the attestation request; and include the cryptographic nonce in the attestation response.

15. The limited subsystem of claim 12, wherein the instructions when executed further cause the host computing device to:

verify the host computing device as a target of the attestation request using a first identifier included in the attestation request.

16. The limited subsystem of claim 12, wherein the attestation request is generated from within the virtual machine.

* * * * *